United States Patent [19]

Shimizu

[11] Patent Number: 4,732,631

[45] Date of Patent: Mar. 22, 1988

[54] METHOD OF MANUFACTURING A TAPE HAVING A SERIES OF SURFACE-TYPE FASTENER PIECES

[75] Inventor: Kozo Shimizu, Kurobe, Japan

[73] Assignee: Yoshida Kogyo K.K., Tokyo, Japan

[21] Appl. No.: 884,900

[22] Filed: Jul. 14, 1986

[30] Foreign Application Priority Data

Jul. 19, 1985 [JP] Japan ................................ 60-157995

[51] Int. Cl.$^4$ ........................ B32B 31/08; B32B 31/18

[52] U.S. Cl. .................................... 156/73.3; 156/248; 156/251; 156/267; 156/515; 156/580.1; 156/580.2; 24/442; 24/448

[58] Field of Search ...................... 156/73.1, 73.3, 251, 156/515, 580.1, 580.2, 248, 267, 268, 309.6; 24/442, 444, 448, 452

[56] References Cited

U.S. PATENT DOCUMENTS

| | | | |
|---|---|---|---|
| 3,370,818 | 2/1968 | Perr | 24/442 |
| 4,157,272 | 6/1979 | Kuroda | 156/268 |
| 4,500,372 | 2/1985 | Mion | 156/73.3 |

FOREIGN PATENT DOCUMENTS

| | | |
|---|---|---|
| 57-2808 | 1/1982 | Japan . |
| 60-98409 | 7/1985 | Japan . |

*Primary Examiner*—Donald E. Czaja
*Assistant Examiner*—Lori Cuervo
*Attorney, Agent, or Firm*—Hill, Van Santen, Steadman & Simpson

[57] ABSTRACT

A tape having a series of surface-type fastener pieces is manufactured by intermittently feeding a surface-type fastener tape blank composed of a release sheet of paper and a surface-type fastener of synthetic resin attached by an adhesive layer to the release sheet and comprising a base strip and a plurality of fastening elements, and fusing the surface-type fastener in a predetermined pattern by ultrasonic or high-frequency welding to produce gaps which define a series of surface-type fastener pieces on the release sheet. The release sheet with the series of surface-type fastener pieces attached thereto by the adhesive layer is then separated from a scrap composed of a surface-type fastener web from which the surface-type fastener pieces have been blanked out. Each of the surface-type fastener pieces is fused along its peripheral edge to prevent the fastening elements thereon from unraveling.

4 Claims, 27 Drawing Figures

METHOD OF MANUFACTURING A TAPE HAVING A SERIES OF SURFACE-TYPE FASTENER PIECES

BACKGROUND OF THE INVENTION

1. Field of the Invention

The present invention relates to a method of manufacturing a tape having a succession of surface-type fastener pieces each comprising a multiplicity of fastening elements such as hooks or loops for use of a cover of a pocket on a garment, a bag, a brief case, or the like, or for use as a fastener on a diaper cover, a blood-pressure cuff, or the like.

2. Description of the Prior Art

FIG. 7 of the accompanying drawings shows a known surface-type fastener tape blank 50 comprising a release sheet 51 of paper and a surface-type fastener 52 attached by an adhesive layer 53 to the release sheet 51. The surface-type fastener 52 has a multiplicity of fastening elements 54 such as loops 55 (FIGS. 8A, 9A and 10A) or hooks 56 (FIGS. 8B, 9B and 10B). As disclosed in Japanese Laid-Open Utility Model Publication No. 57-2808, circular surface-type fastener pieces 57, 58 (FIGS. 8A and 8B) having loops 55 and hooks 56, respectively, or elliptical surface-type fastener pieces 59, 60 (FIGS. 9A and 9B) having loops 55 and hooks 56, respectively, or heart-shaped surface-type fastener pieces 61, 62 (FIGS. 10A and 10B) having loops 55 and hooks 56, respectively, may be cut out of the surface-type fastener blank 50. The surface-type fastener pieces 57 through 62 are however disadvantageous in that the release sheet 51 cannot easily be peeled off from the fastener pieces of the same size and it is time-consuming and laborious to keep many individual fastener pieces in storage.

As illustrated in FIGS. 11A through 11C, Japanese Laid-Open Utility Model Publication No. 60-98409 discloses a method of manufacturing surface-type fastener tape blanks 63, 64, 65 having series of triangular, circular and rectangular surface-type fastener pieces or chips 66, 67, 68 (FIGS. 12A, 12B, 12C), respectively, defined by cuts 69, 70, 71 each having a connecting portion 72. As shown in FIG. 13, the surface-type fastener tape blank 63, for example, is wound around a takeup reel 73.

For detaching a surface-type fastener chip 66 from the surface-type fastener tape blank 63, the tape blank 63 is unreeled from the takeup reel 73 and drawn downwardly around a guide roller 74 for manual removal. However, when the surface-type fastener tape blank 63 is pulled around the guide roller 74, the surface-type fastener chip 66 tends to depend from its cuts 69 and cannot easily be separated by hand from the surface-type fastener tape blank 63. Furthermore, since no adhesive is applied to the underside of each chip 66, the separated chip 66 must be attached to a desired article by suitable means such as sewing.

Another conventional arrangement is illustrated in FIG. 14. A surface-type fastener tape blank 75 from which surface-type fastener pieces are to be removed is composed of a release sheet 76 of paper and a surface-type fastener 77 attached by an adhesive layer 78 to the release sheet 76. The surface-type fastener tape blank 75 is fed between an upper movable die 82 and a lower fixed die 80. The upper movable die 82 has a cutter blade 81 of a desired shape. In operation, the upper movable die 82 is lowered by a press (not shown) to cause the cutter blade 81 to cut off a surface-type fastener piece from the surface-type fastener tape blank 75, without severing the release sheet 76. The upper movable die 82 is repeatedly moved downwardly and upwardly while the surface-type fastener tape blank 75 is intermittently fed, thereby defining a series of surface-type fastener pieces 79 on the release sheet 76. The surface-type fastener pieces 79 on the release sheet 76 are then wound around a takeup reel 90, whereas a surface-type fastener scrap 91 from which the surface-type fastener pieces 79 have been blanked out is wound around a takeup reel 92.

However, much skill is required on the part of the operator for adjusting the gap between the cutter blade 81 as it is in the lowermost position and the lower fixed die 80 to prevent the cutter blade 81 from cutting off the release sheet 76. For the release sheet 76 would be severed if the gap were too small, and the surface-type fastener 77 would not be severed if the gap were too large. As the surface-type fastener 77 is repeatedly cut off by the cutter blade 81, an adhesive deposit becomes applied to the cutter blade 81. Such an adhesive deposit should periodically be removed from the cutter blade 81 in order to keep the cutter blade 81 effective to cut off the surface-type fastener 77 neatly and completely. When cut off by the cutter blade 81, some fastening elements such as loops or hooks of the surface-type fastener 77 are liable to fall off and cause damage to the skin of the user or a garment of the user, and are also apt to start unraveling the surface-type fastener piece 79.

One known solution is to attach a cushioning member 83 to the cutter blade 81 for protecting the cutter blade 81 and preventing the adhesive material and debris from being deposited on the cutter blade 81. However, use of the cushioning member 83 has proven unsatisfactory.

SUMMARY OF THE INVENTION

It is an object of the present invention to provide a method of manufacturing a tape having a series of surface-type fastener pieces, easily and reliably without severing the release sheet while preventing the fastening elements on the peripheral edge of each of the fastener pieces from being unraveled.

According to the present invention, a tape having a series of surface-type fastener pieces is manufactured by intermittently feeding a surface-type fastener tape blank composed of a release sheet of paper and a surface-type fastener of synthetic resin attached by an adhesive layer to the release sheet and comprising a base strip and a plurality of fastening elements, fusing the surface-type fastener by ultrasonic or high-frequency welding to a predetermined pattern to produce gaps which define a series of surface-type fastener pieces on the release sheet, and separating the release sheet with the series of surface-type fastener pieces attached thereto by the adhesive layer from a scrap composed of a surface-type fastener web from which the surface-type fastener pieces have been blanked out. Each of the surface-type fastener pieces, which may be of any desired shape, is fused along its peripheral edge to prevent the fastening elements thereon from unraveling.

Many other advantages and features of the present invention will become manifest to those versed in the art upon making reference to the detailed description and the accompanying sheets of drawings in which preferred embodiments incorporating the principles of the present invention are shown by way of illustrative example.

DETAILED DESCRIPTION

Figure 6A:
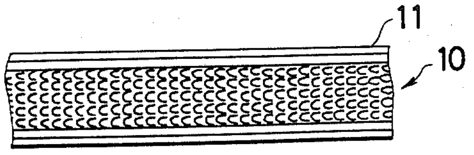
FIG. 6A is a fragmentary plan view of a surface-type fastener tape blank.
Figure 6B:
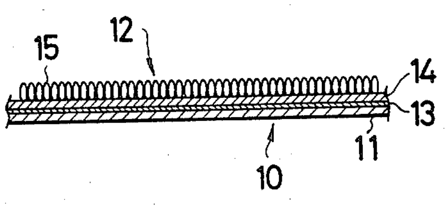
FIG. 6B is a longitudinal cross-sectional view of the surface-type fastener tape blank of FIG. 6A.

As shown in FIGS. 6A and 6B, an elongate surface-type fastener tape blank 10 comprises a release sheet 11 of paper and an elongate surface-type fastener 12 bonded by an adhesive layer 13 to one surface of the release sheet 11. The surface-type fastener 12 is of a known construction having a base strip 14 supporting on one surface thereof a multiplicity of fastening elements 15 such as hooks or loops, the adhesive layer 13 being applied to the opposite surface of the base strip 14. The surface-type fastener 12 is usually made of synthetic resin fibers. Although the fastening elements are illustrated as loops, they may be hooks.

Figure 1:
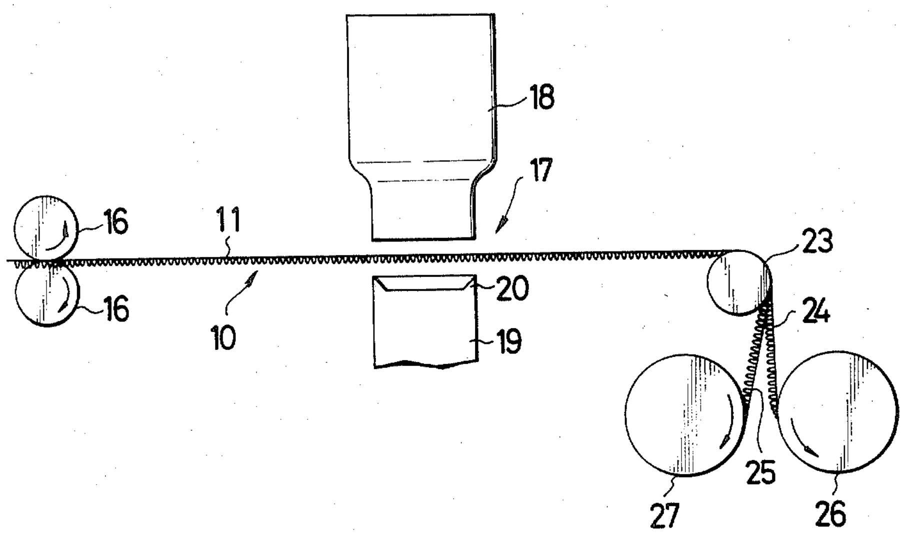
FIG. 1 is a schematic front elevational view of an apparatus employing an ultrasonic welder for carrying out the method according to the present invention.

As illustrated in FIG. 1, the surface-type fastener tape blank 10 is intermittently fed, with the fastening elements 15 facing downwardly, along a feed path by a pair of feed rollers 16 to an ultrasonic welder 17 including a known ultrasonic oscillator (not shown), an oscillating horn 18 disposed above the feed path and coupled to the ultrasonic oscillator, and an anvil 19 disposed below the feed path in vertical alignment with the oscillating horn 18. The anvil 19 has a cutter blade 20 of a desired shape, such as a circle, on an upper end surface thereof.

Figure 6C:
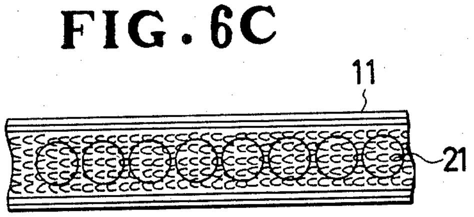
FIG. 6C is a fragmentary plan view of the surface-type fastener tape blank as cut by a cutter blade.

With the surface-type fastener tape blank 10 positioned between the oscillating horn 18 and the anvil 19, the ultrasonic oscillator is energized to cause the oscillating horn 18 to vibrate ultrasonically, and the oscillating horn 18 and the anvil 19 are moved toward each other until they press the surface-type fastener tape blank 10 therebetween. When the surface-type fastener tape blank 10 is pressed between the oscillating horn 18 and the anvil 19, the tape blank 10 is ultrasonically fused by the cutter blade 20. More specifically, ultrasonic vibration is imparted from the cutter blade 20 to the surface-type fastener tape blank 10 to fuse the latter in the pattern given by the shape of the cutter blade 20. When the ultrasonic vibration is applied to the surface-type fastener 12, the applied mechanical vibration energy is converted to thermal energy that produces heat with which the surface-type fastener 12 is fused and the adhesive layer 13 underneath the surface-type fastener 12 is melted. The melted adhesive is pushed by the cutter blade 20 away from the fused pattern of the surface-type fastener 12. Where the cutter blade 20 is of a circular shape, the surface-type fastener 12 is fused thereby to produce a succession of circular surface-type fastener pieces or components 21 as shown in FIG. 6C when the surface-type fastener tape blank 10 is intermittently fed and successively processed by the ultrasonic welder 17.

Figure 6D:
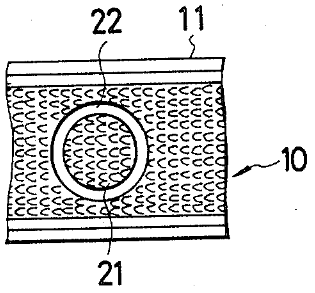
FIG. 6D is an enlarged fragmentary plan view of a circular surface-type fastener piece surrounded by an adhesive-free region or gap on the surface-type fastener tape blank illustrated in FIG. 6C.
Figure 6E:
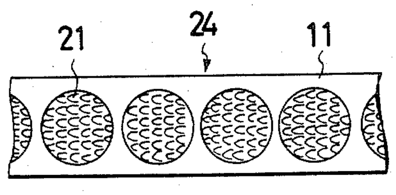
FIG. 6E is a fragmentary plan view of a completed tape having a series of surface-type fastener pieces mounted on an elongate release sheet of paper.
Figure 6F:
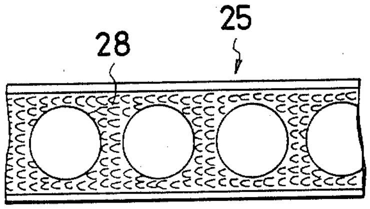
FIG. 6F is a fragmentary plan view of a scrap separated from the surface-type fastener blank of FIG. 6C to produce the tape of FIG. 6E.
Figure 6G:
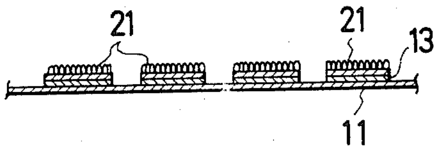
FIG. 6G is a longitudinal cross-sectional view of the completed tape.
Figure 7:
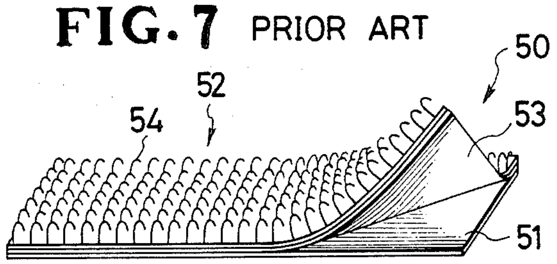
FIG. 7 PRIOR ART
FIG. 7 is a perspective view of a conventional surface-type fastener tape.
Figure 8A:
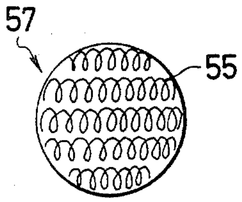
FIG. 8A PRIOR ART
FIGS. 8A and 8B are plan views of conventional surface-type fastener components.
Figure 8B:
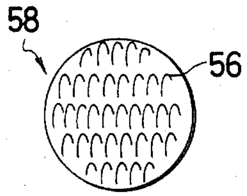
FIG. 8B PRIOR ART
Figure 9A:
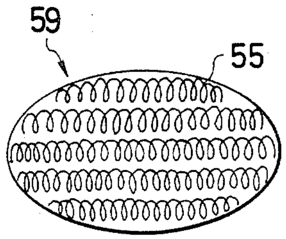
FIG. 9A PRIOR ART
FIGS. 9A and 9B are plan views of other conventional surface-type fastener components.
Figure 9B:
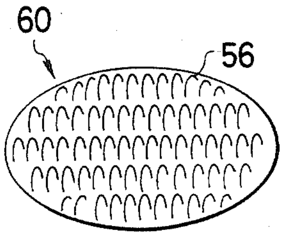
FIG. 9B PRIOR ART
Figure 10A:
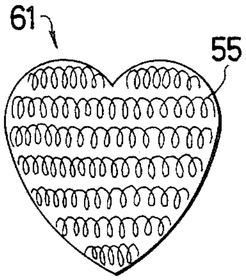
FIG. 10A PRIOR ART
FIGS. 10A and 10B are plan views of still other conventional surface-type fastener components.
Figure 10B:
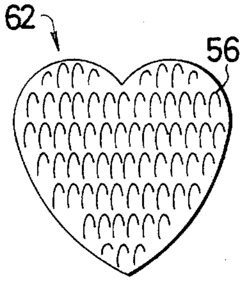
FIG. 10B PRIOR ART
Figure 11A:
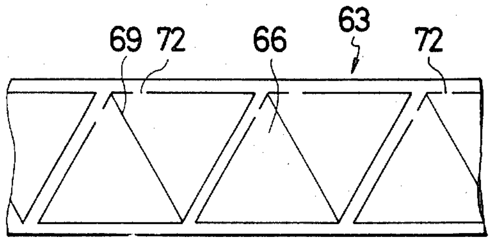
FIG. 11A PRIOR ART
FIGS. 11A through 11C are fragmentary plan views of other prior surface-type fastener tapes.
Figure 11B:
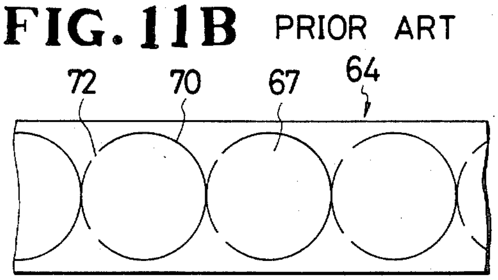
FIG. 11B PRIOR ART
Figure 11C:
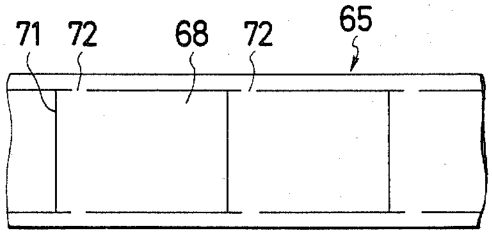
FIG. 11C PRIOR ART
Figure 12A:
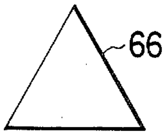
FIG. 12A PRIOR ART
FIGS. 12A through 12C are plan views of other prior surface-type fastener components.
Figure 12B:
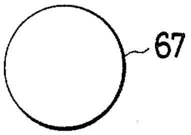
FIG. 12B PRIOR ART
Figure 12C:
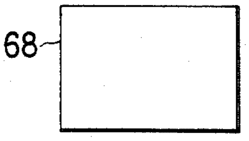
FIG. 12C PRIOR ART
Figure 13:
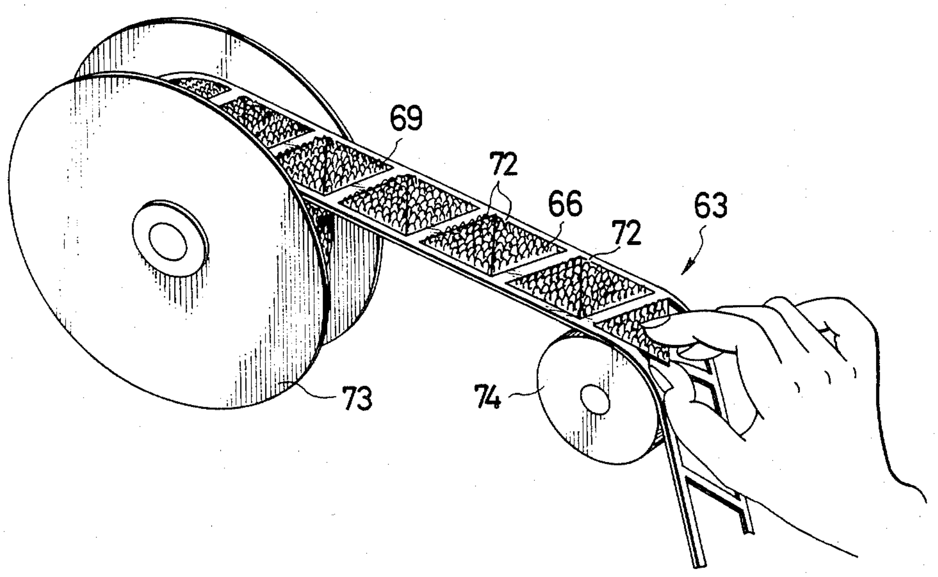
FIG.13 PRIOR ART
FIG. 13 is a perspective view showing the manner in which a surface-type fastener component is peeled off the surface-type fastener tape of FIG. 11A.
Figure 14:
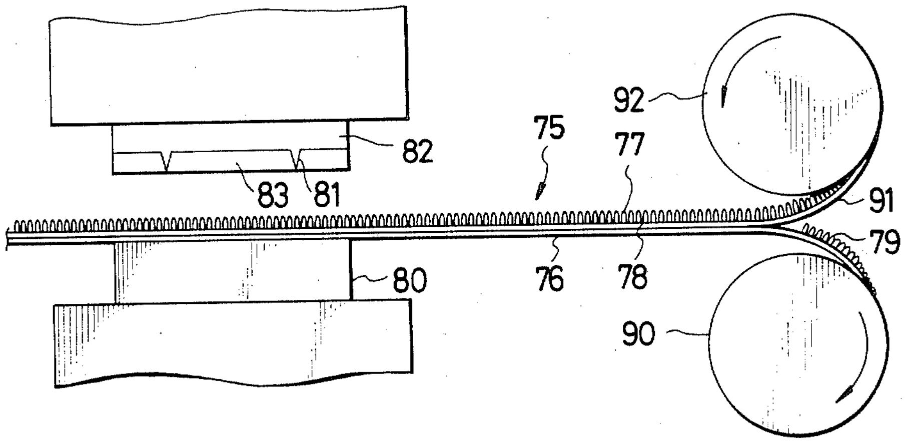
FIG. 14 PRIOR ART
FIG. 14 is a schematic front elevational view of an apparatus for use in manufacturing a conventional surface-type fastener tape.

As shown in FIG. 6D at an enlarged scale, each of the circular surface-type fastener pieces 21 is surrounded by an annular gap 22 formed by pushing the melted adhesive away from the fused pattern of the surface-type fastener 12 by the cutter blade 20. The surface-type fastener tape blank 10 is thereafter fed around a feed roller 23 (FIG. 1) where it is separated into a tape 24 and an elongate scrap 25, which are then wound around takeup reels 26, 27, respectively. The winding-up of the elongate scrap 25 may take place during the formation of the annular gap 22, preferably immediately after the surface-type fastener 12 has been fused to provide the surface-type fastener pieces 21. As illustrated in FIGS. 6E and 6G, the tape 24 comprises the release sheet 11 and the series of circular surface-type fastener pieces 21 with circular adhesive layers 13 interposed therebetween. The elongate scrap 25 comprises a surface-type fastener web 28 from which the surface-type fastener pieces 21 have been blanked out. The tape 24 and the elongate scrap 25 can easily be separated from each other because of the presence of the gaps 22 therebetween.

In order to prevent the release sheet 11 from being severed by the ultrasonic welder 17, it is necessary to keep the oscillating horn 18 and the anvil 19 spaced from each other by a small distance when they press the surface-type fastener tape blank 10 therebetween to fuse the surface-type fastener 12.

Figure 2:
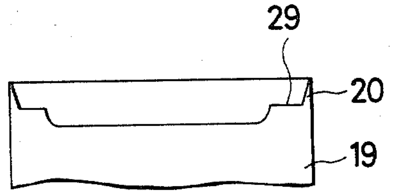
FIG. 2 is an enlarged fragmentary front elevational view of the anvil of the ultrasonic welder shown in FIG. 1.

As shown in FIG. 2, the anvil 19 preferably has an annular step 29 facing upwardly and extending radially inwardly of the cutter blade 20. The annular step 29 serves to press the fastening elements 15 along the periphery of each circular surface-type fastener piece 21 against the base strip 14 so that the pressed fastening elements 15 can be fused to the base strip 14 against unraveling.

Figure 3:
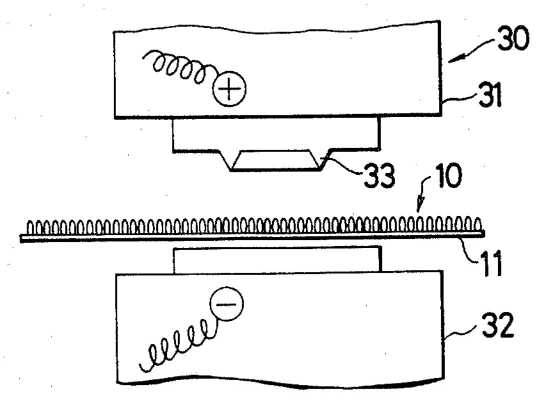
FIG. 3 is an enlarged fragmentary front elevational view of a high-frequency welder comprising an induction heater.
Figure 4:
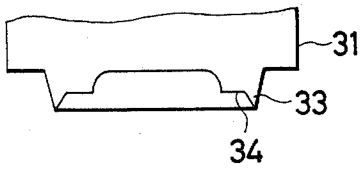
FIG. 4 is an enlarged fragmentary front elevational view of the upper movable die of the induction welder shown in FIG. 3.

FIG. 3 shows a high-frequency welder 30 which can be used to cut the surface-type fastener tape blank 10. The high-frequency welder 30 comprises an induction heater composed of an upper movable die 31 and a lower fixed die 32 between which the surface-type fastener tape blank 10 is fed. The upper movable die 31 which supports a cutter blade 33 of a desired shape on its lower surface is movable toward and away from the lower fixed die 32. The upper movable die 31 is connected to a positive power supply terminal and hence serves as a positive electrode, whereas the lower movable die 32 is connected to a negative power supply terminal and hence serves as a negative electrode. In operation, the upper movable die 31 is lowered to press the surface-type fastener tape blank 10 against the lower fixed die 32. When a high-frequency voltage is applied between the upper movable die 31 and the lower fixed die 32, the surface-type fastener tape blank 10 is heated beyond its softening point so that it is fused by the cutter blade 33 in the pattern defined by the shape thereof. As shown in FIG. 4, the upper movable die 31 also has a continuous step 34 facing downwardly and extending inwardly of the cutter blade 33 for preventing peripheral fastening elements of a formed surface-type fastener piece from being unraveled.

Figure 5:
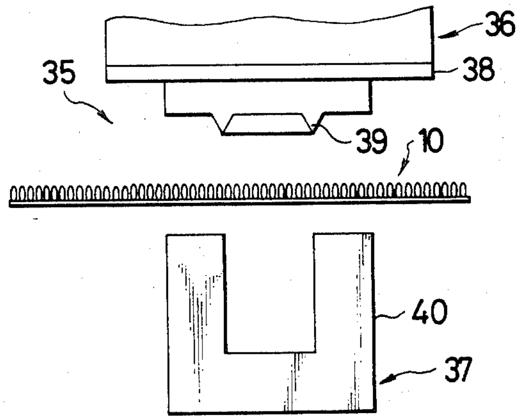
FIG. 5 is an enlarged fragmentary front elevational view of another high-frequency welder comprising an induction heater.

FIG. 5 illustrates another high-frequency welder 35 comprising an induction heater. The high-frequency welder comprises an upper movable die 36 and a lower fixed die 37 between which the surface-type fastener tape blank 10 is positioned. The upper movable die 36 has a magnetic plate 38 attached to the lower surface thereof and supporting thereon a cutter blade 39 directed downwardly. The lower fixed die 37 comprises a high-frequency induction heater coil 40. The upper movable die 36 is moved downwardly to press the surface-type fastener tape blank 10 against the lower fixed die 37. When the induction heater coil 40 is supplied with a high-frequency current, the surface-type fastener tape blank 10 is heated beyond its softening point and fused by the cutter blade 39 in the pattern which is the same as the shape of the cutter blade 39.

Even when the surface-type fastener tape blank 10 is heated by the high-frequency welder 30 (FIG. 3) or 35 (FIG. 5) to the temperature at which the surface-type fastener 12 of synthetic fibers is fused, the release sheet 13 of paper is not cut off since the temperature at which it will be severed is substantially higher than the fusion temperature of the surface-type fastener 12.

The shape of the cutter blade 20, 33, 39 may be changed to give the surface-type fastener pieces any desired pattern.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of manufacturing a tape having a series of surface-type fastener pieces, comprising the steps of:

intermittently feeding a surface-type fastener tape blank composed of a release sheet of paper and a surface-type fastener of synthetic resin attached by an adhesive layer to the release sheet and comprising a base strip and a plurality of fastening elements;

fusing said surface-type fastener in a predetermined pattern and melting the adhesive layer along said pattern and pushing it away from said pattern to produce gaps which define a series of surface-type fastener pieces on said release sheet;

pressing the fastening elements along the periphery of each fastener piece against said base strip to fuse said peripheral fastening elements to said base strip; and after the production of the gaps, separating said release sheet with said series of surface-type fastener pieces attached thereto by said adhesive layer from a scrap composed of a surface-type fastener web from which the surface-type fastener pieces have been blanked out.

2. A method according to claim 1, wherein said surface-type fastener is fused by ultrasonic welding.

3. A method according to claim 1, wherein said surface-type fastener is fused by high-frequency welding.

4. A method according to claim 1, wherein each of said surface-type fastener pieces is fused along its peripheral edge to prevent the fastening elements thereon from unraveling.

* * * * *